Figure 1:
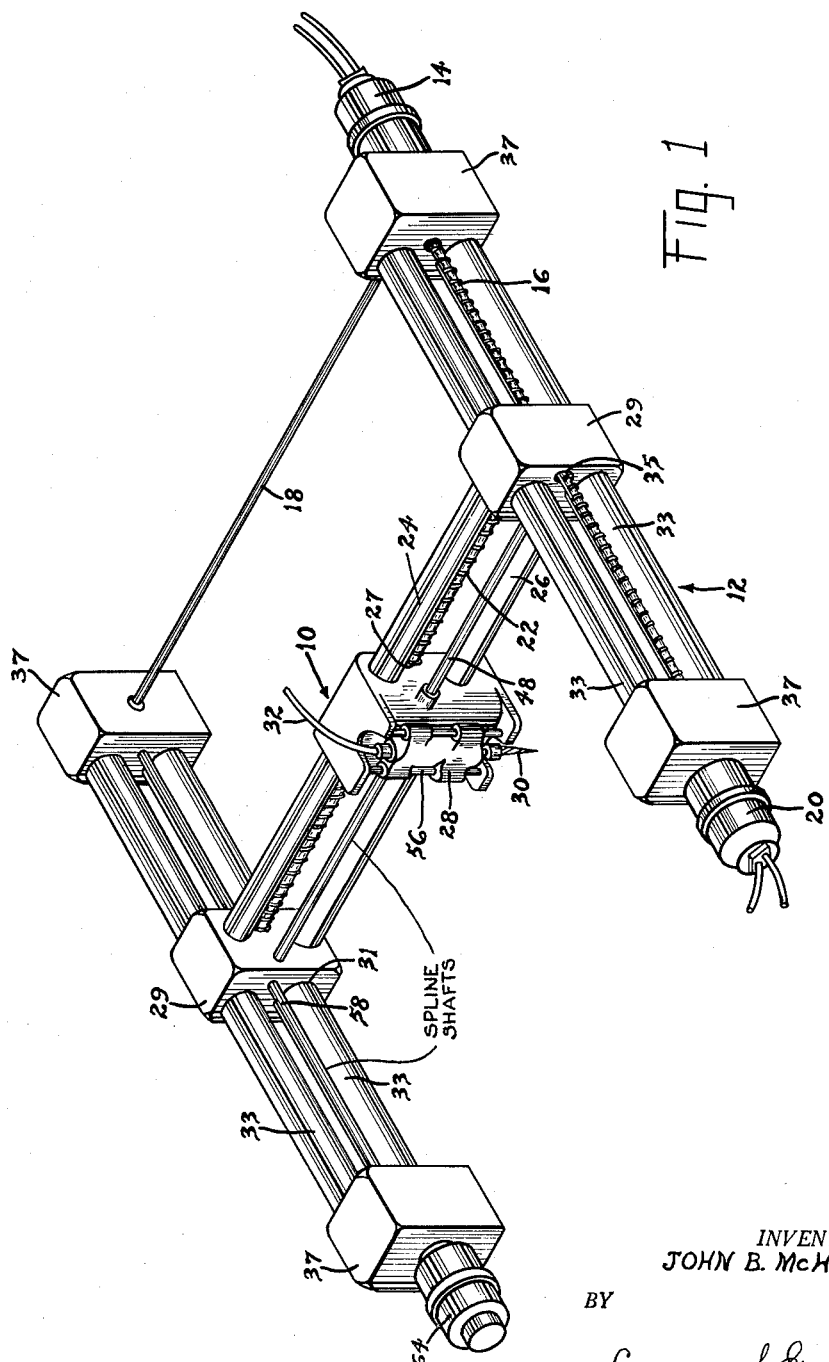

April 25, 1961 J. B. McHUGH 2,981,123
COORDINATE POSITIONER
Filed Nov. 26, 1958 2 Sheets-Sheet 1

INVENTOR.
JOHN B. McHUGH
BY
Lawrence S. Epstein
ATTORNEYS

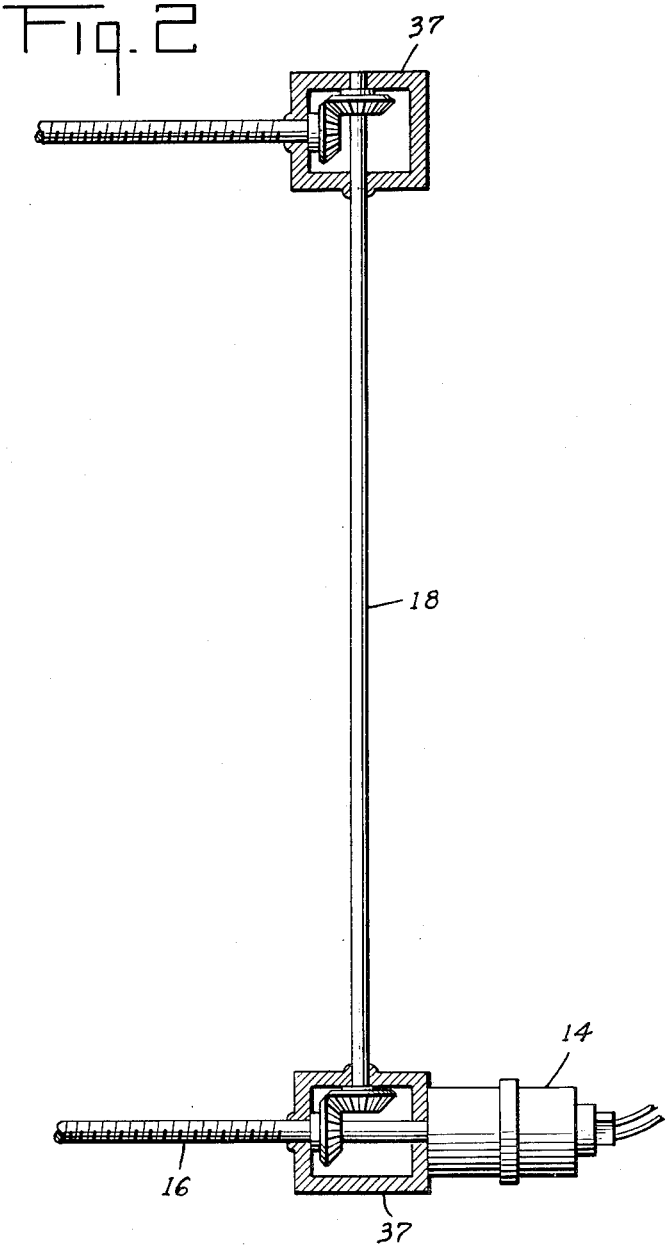

# United States Patent Office

2,981,123
Patented Apr. 25, 1961

2,981,123

COORDINATE POSITIONER

John B. McHugh, Philadelphia, Pa., assignor, by mesne assignments, to the United States of America as represented by the Secretary of the Navy Filed Nov. 26, 1958, Ser. No. 776,650

3 Claims. (Cl. 74—665)

This invention relates generally to positioning mechanisms and more particularly to a coordinate positioner useable with the master terrain model system.

This invention, while generally applicable, is preferably utilized in conjunction with the system disclosed in patent application Serial No. 774,791, filed November 18, 1958, and the elements which are the subject of patent applications Serial Nos. 775,327, filed November 20, 1958, 775,328, filed November 20, 1958, 775,331, filed November 20, 1958, 776,652, filed November 26, 1958, 778,271, filed December 4, 1958, and Patent No. 2,876,562.

An important subject of the invention is to provide a coordinate positioner whose mass inertia of mechanical linkages is low.

Another object of the invention is to provide a coordinate positioner having low system friction, thus permitting precise control of servo dampening.

Still another object of the invention is to provide a coordinate positioner with minimum mechanical backlash and small servo phase lag.

Other objects and many of the attendant advantages of this invention will be readily appreciated as the same becomes better understood by reference to the following detailed description when considered in connection with the accompanying drawing wherein:

Figure 1 reveals the preferred form of the instant inventive coordinate positioner;

Fig. 2 is a diagrammatic showing of a portion of the mechanism.

Referring to Figure 1, a cutting block 10 is slidably mounted on bearing shafts 24 and 26. The bearing shafts 24 and 26 are, in the preferred form of the invention, physically positioned one above the other to prevent rotation of the cutting block 10 in a plane which is perpendicular to the direction in which the cutting block 10 is moved. A lead screw 22 is screwably retained in an opening 27 in the cutting block 10. When the lead screw is rotated the cutting block 10 moves along the bearing shafts 24 and 26. Movement along bearing shafts 24 and 26 shall hereinafter be referred to as movement in a "Y" direction. The bearing shafts 24 and 26 are fixedly mounted on opposing carriages 29. The carriages 29 are provided with openings 31 which encompass the bearing shafts 33 and serve to allow the carriages to be slidably moved on the bearing shafts 33. Movement along bearing shafts 33 shall hereinafter be referred to as movement in the "X" direction. An opening 35 is provided in each of the carriages 29 and screwably retains the lead screw 16. As the lead screw 16 is rotated, the carriages are in an "X" direction. Corner supports 37 fixedly support the bearing shafts 33 and the motors 14, 20 and 64. Motor 14 is operable with the lead screw 16 to drive the carriages 29 in an "X" direction. Motor 20 is operable through an actuator spline (not shown) and operates to drive the lead screw 22 and thereby position the cutting block 10 in a "Y" direction. Motor 64 drives the actuator spline 58 which operates to drive the control spline 48 to position the tool 30 along its axis as is revealed in patent application No. 776,652, filed November 26, 1958. Movement along the axis of the tool shall hereinafter be referred to as movement in the "Z" direction.

In the preferred form of the invention a drive shaft 18 is driven by motor 14 when motor 14 drives lead screw 16. The drive shaft 18 then operates through bevel gearing as shown in Fig. 2 to drive a second lead screw and thus prevent lagging of one carriage 29 behind the other.

In operation, activation of motor 14 operates to drive the lead screw 16 and thereby position the carriage 29 in the "X" direction. Rotational motion is transferred to a second carriage by the drive shaft 18 which operates to drive a second lead screw via a bevel gearing arrangement contained in a second corner support. The carriage are easily moved in the "X" direction by sliding motion on the bearing shafts 33, rotation of the motor 20 operates to drive a spline actuator which drives the lead screw 22 through a bevel gearing arrangement contained in the carriage 29. Positioning of the cutting block elements is accomplished by the rotation of motor 64 which drives the actuator spline 58. The actuator spline 58 rotates the control spline 48 through a bevel gearing arrangement as was described in patent application No. 776,652, filed November 20, 1958. Protection of all bearing shafts is accomplished by the use of a bellows-type seal covering all shafts and lead screw and splines.

Obviously many modifications and variations of the present invention are possible in the light of the above teachings. It is therefore to be understood that within the scope of the appended claims the invention may be practiced otherwise than as specifically described.

I claim:

1. A coordinate positioner comprising first, second, third and fourth corner supports, first bearing shaft means joining the first and second of said corner supports, second bearing shaft means joining the third and fourth corner supports, first and second carriages having openings therein and slidable on each of said bearing shaft means, third bearing shaft means coupling said carriages, positionable means having openings therein and slidable on said third bearing shaft means, a first lead screw rotatably supported by said first and second corner supports, a second lead screw rotatably supported by said third and fourth corner supports, said first and second lead screws being screwably retained in one of said first and second carriage openings respectively, a first drive means operable with said first and second lead screws, a third lead screw rotatably supported by said carriage and screwably retained in one of said positionable means openings, and a second drive means operable with said third lead screw.

2. A coordinate positioner comprising first, second, third and fourth corner supports, first bearing shaft means joining the first and second of said corner supports, second bearing shaft means joining the third and fourth corner supports, first and second carriages having openings therein and slidable on each of said bearing shaft means, third bearing shaft means coupling said carriages, positionable means having openings therein and slidable on said third bearing shaft means, a first lead screw rotatably supported by said first and second corner supports, a second lead screw rotatably supported by said third and fourth corner supports, said first and second lead screws being screwably retained in one of said first and second carriages openings respectively, drive shaft means, a first motor operable with said first lead screw directly and with said second lead screw through said drive shaft, a third lead screw rotatably supported by said carriages and screwably retained in one of said positionable means openings, and a drive means fixedly mounted and operable with said third lead screw.

3. A coordinate positioner comprising first, second, third and fourth corner supports, a first pair of spacially aligned bearing shafts joining the first and second of said corner supports, a second pair of spacially aligned bearing shafts joining the third and fourth corner supports, first and second carriages having openings therein and slidable on each of said pairs of bearing shafts, a third pair of spacially aligned bearing shafts coupling said carriages, positionable means having openings therein and slidable on said third pair of bearing shafts, a first lead screw rotatably supported by said first and second corner supports, a second lead screw rotatably supported by said third and fourth corner supports, said first and second lead screws being screwably retained in one of said first and second carriages openings respectively, drive shaft means, a first motor operable with said first lead screw directly and with said second lead screw through said drive shaft, a third lead screw rotatably supported by said carriages and screwably retained in one of said positionable means openings, and a second motor operable with said third lead screw.

References Cited in the file of this patent

UNITED STATES PATENTS

| | | |
|---|---|---|
| 289,881 | Beck et al. | Dec. 11, 1883 |
| 499,934 | Pine | June 20, 1893 |
| 2,090,270 | Swanson | Aug. 17, 1937 |
| 2,654,165 | Lichtenberg | Oct. 6, 1953 |
| 2,837,707 | Stokes | June 3, 1958 |

FOREIGN PATENTS

| | | |
|---|---|---|
| 1,103,602 | France | May 25, 1955 |